US009522493B2

(12) United States Patent
Nakatani et al.

(10) Patent No.: US 9,522,493 B2
(45) Date of Patent: Dec. 20, 2016

(54) MOULDED BODY HAVING SPECIFIC CROSS-SECTIONAL STRUCTURE

(71) Applicant: KANEKA CORPORATION, Osaka-shi, Osaka (JP)

(72) Inventors: Kazushi Nakatani, Settsu (JP); Hidekazu Kawakubo, Settsu (JP); Kazunori Saegusa, Settsu (JP)

(73) Assignee: KANEKA CORPORATION, Osaka (JP)

(*) Notice: Subject to any disclaimer, the term of this patent is extended or adjusted under 35 U.S.C. 154(b) by 0 days.

(21) Appl. No.: 14/419,054

(22) PCT Filed: Jul. 10, 2013

(86) PCT No.: PCT/JP2013/068819
§ 371 (c)(1),
(2) Date: Feb. 2, 2015

(87) PCT Pub. No.: WO2014/027534
PCT Pub. Date: Feb. 20, 2014

(65) Prior Publication Data
US 2015/0165659 A1 Jun. 18, 2015

(30) Foreign Application Priority Data

Aug. 16, 2012 (JP) ................................ 2012-180538

(51) Int. Cl.
*B32B 3/00* (2006.01)
*B29C 45/00* (2006.01)
(Continued)

(52) U.S. Cl.
CPC ........... *B29C 45/0025* (2013.01); *B62D 29/04* (2013.01); *C08L 69/00* (2013.01);
(Continued)

(58) Field of Classification Search
CPC ............. B29C 37/0053; B29C 37/0057; B29C 45/0025; B29C 2045/0043; B62D 29/04; C08L 69/00; Y10T 428/24174; Y10T 428/24182; Y10T 428/24479; Y10T 428/2457; Y10T 428/24942; Y10T 428/2495
(Continued)

(56) References Cited

U.S. PATENT DOCUMENTS

| | | | |
|---|---|---|---|
| 5,424,112 A | 6/1995 | Kataoka et al. | |
| 2010/0178465 A1* | 7/2010 | Ishii | B29C 45/0025 428/156 |
| 2013/0220048 A1* | 8/2013 | Iijima | F16H 55/06 74/434 |

FOREIGN PATENT DOCUMENTS

| | | |
|---|---|---|
| JP | 52-41358 | 3/1977 |
| JP | 6-210659 A | 8/1994 |

(Continued)

OTHER PUBLICATIONS

International Search Report dated Oct. 22, 2013, issued in corresponding application No. PCT/JP2013/068819.

*Primary Examiner* — Aaron Austin
*Assistant Examiner* — Megha Gaitonde
(74) *Attorney, Agent, or Firm* — Westerman, Hattori, Daniels & Adrian, LLP

(57) ABSTRACT

A molded body 1 includes a rib part 3 standing on a back surface 2b opposite to a design surface 2a of a main body 2 of the molded body 1. A reduced thickness part 4 is formed on the back surface 2b of the main body 2, the ratio D/T is 0.975 to 1.07 where D is the diameter of a circle that passes through base ends 3b of both side faces 3a of the rib part 3 and is in contact with the design surface 2a of the main body 2 positioned between the base ends 3b, and T is the thickness of the main body 2 at an outer side of the reduced thickness part 4, and $t<1.3(T-n)$ is satisfied where t is the thickness of the rib part 3, and n is the thickness of the reduced thickness part 4.

12 Claims, 1 Drawing Sheet

(51) Int. Cl.
*C08L 69/00* (2006.01)
*B62D 29/04* (2006.01)
B29K 67/00 (2006.01)
B29K 69/00 (2006.01)
B29K 71/00 (2006.01)
B29K 105/00 (2006.01)
B29L 31/30 (2006.01)

(52) U.S. Cl.
CPC .. *B29C 2045/0043* (2013.01); *B29K 2067/00* (2013.01); *B29K 2069/00* (2013.01); *B29K 2071/00* (2013.01); *B29K 2105/0085* (2013.01); *B29K 2105/0088* (2013.01); *B29L 2031/3005* (2013.01); *Y10T 428/24479* (2015.01)

(58) Field of Classification Search
USPC ....... 428/119, 120, 156, 158, 159, 163, 165, 428/167, 212, 213
See application file for complete search history.

(56) References Cited

FOREIGN PATENT DOCUMENTS

| | | |
|---|---|---|
| JP | 10-151640 A | 6/1998 |
| JP | 11-123738 A | 5/1999 |
| JP | 2004-138137 A | 5/2004 |
| JP | 2005-67564 A | 3/2005 |
| JP | 2010-254739 A | 11/2010 |

* cited by examiner

MOULDED BODY HAVING SPECIFIC CROSS-SECTIONAL STRUCTURE

TECHNICAL FIELD

The present invention relates to a moulded body having a specific cross-sectional structure preferably applicable to various parts in household appliances and vehicles.

BACKGROUND ART

Polycarbonate resins have been known to have the highest impact resistance of the engineering plastics and to have good heat resistance, and have been used in various fields by utilizing these characteristics. However, the polycarbonate resins have drawbacks such as poor chemical resistance, poor moldability, and dependence of impact strength on their thickness.

Thermoplastic polyesters have excellent chemical resistance and moldability but have drawbacks such as poor impact resistance and poor dimensional stability.

In order to take advantage of the characteristics of each material and to compensate for their drawbacks, various resin compositions including a combination of the polycarbonate resin and the thermoplastic polyester resin have been developed and studied to simultaneously satisfy characteristics required for automobile parts and other products, such as impact resistance, heat resistance, chemical resistance, weatherability, and moldability.

A resin composition containing the polycarbonate resin and a polyester modified with polyethylene glycol, polytetramethylene glycol, or the like has also been developed. Such a resin composition has higher moldability but may have insufficient heat resistance for exterior parts of automobiles.

Separately, a resin composition containing the polycarbonate resin and a polyester-polyether copolymer comprising a polyalkylene glycol adduct of a bisphenol as a block unit and being prepared by using a germanium catalyst has been developed. For example, Patent Document 1 discloses a resin composition containing 30 parts of a polyethylene terephthalate block copolymer composed of 30% of bisphenol A polyethylene oxide adduct having a molecular weight of 1,000 and 70 parts of polycarbonate. The resin composition has an excellent balance of moldability, heat resistance, and impact resistance without impairing a surface appearance of a moulded body of the composition. Here, the disclosure suggests that the addition of a graft copolymer containing an elastomer as an impact modifier enables an improvement of the impact resistance.

At present, to housings of electrical appliances such as cell phones and personal computers and vehicle parts such as spoilers, fenders, door panels, and back door panels for automobiles, there are strong requirement to further reduce the weights, and thus moulded bodies are required to be thinner. When the thickness of a moulded body is actually tried to be reduced, the resin composition of Patent Document 1, which is excellent as a molding material, is unfortunately, likely to become short shot during injection molding in some cases. In order to solve the short shot, when the number of gates is increased, the number of welds are increased, and this may reduce the strength of a moulded body. In order to solve the short shot, when the moulding temperature is set higher for improving the flowability, a resin composition is consequently, thermally degraded to generate a pyrolysis gas, leading to a poor appearance, in some cases. When produced by using a resin composition similar to a conventional one and by using a mold designed with the same idea as the conventional one, the moulded body having a smaller thickness may have a lower rigidity as a whole, and such a new problem is required to be improved.

In order to give rigidity to a moulded body having a small thickness as a whole and to reinforce the moulded body, for example, a planer structure, which is called a rib, standing perpendicular to a back surface, can be provided on the back surface of the main body of the moulded body opposite to a design surface. This method unfortunately has a problem. In other words, a rib part having an excessively large thickness exerts high rigidity improvement effect but generates a hollow called a sink mark on the design surface of the outer surface of a molded product along the rib part, thus deteriorating the appearance. In order to prevent the sink mark to improve the appearance, a method of reducing the thickness of the rib part is commonly employed. In some cases by using such a method, the rib part cannot be filled with a resin composition, for example, and thus the method cannot achieve the balance between sufficient reinforcement effect and sink mark prevention. Moreover, a moulded body having a smaller thickness has a lower rigidity and thus required more effective reinforcement. Such a moulded body itself cannot be sufficiently filled with a resin composition in addition to the rib part, resulting in an unsatisfactory moulded body, in some cases. Even when the moulded body is obtained, the rib part is insufficiently filled with a resin composition, failing to achieve the reinforcement effect, for example. Conventional technology has a limitation to achieve a smaller thickness.

In order to sufficiently fill the rib part to improve the rigidity and to prevent the sink mark, examples in Patent Document 2 describe a reduced thickness structure where the rib has a thinner base. Patent Document 3 disclosed an automobile side molding having positioning bosses on its back surface. As with the case having ribs, Patent Document 3 disclosed a technique of reducing the thickness of the base of the boss, or a reduced thickness structure around the base of the boss, in order to prevent sink marks from generating on a design surface opposite to the boss parts and to sufficiently fill the bosses themselves with a resin composition to work the bosses. Patent Document 4 discloses a molded product having a rib part on its back surface, and the thickness of the main body of the molded product is reduced from the back surface at both sides of the rib part, that is, reduced thickness parts are formed on the back surface of the main body.

CITATION LIST

Patent Literatures

Patent Document 1: JP-A No. 2010-254739
Patent Document 2: JP-A No. H10-151640
Patent Document 3: JP-A No. 2005-67564
Patent Document 4: JP-A No. H11-123738

SUMMARY OF INDENTION

Technical Problem

The structures described in Patent Documents 2 and 3 prevent sink marks from generating on the surface opposite to the rib part or the boss part, or on the design surface of the main body of a moulded body, and allow the rib part or the boss part to be satisfactory filled with a resin composition and to exert the functions. However, the thickness reduced part is formed around the thin rib part or the boss part to which stress is likely concentrated due to its structure. If an external stress or an impact is applied to the moulded body, an excess load is applied to the reduced thickness part. From the reduced thickness part as the start point, the rib part or the boss part can be destructed, and consequently the moulded body itself can be destructed. Even if the moulded body itself is not destructed, the thin rib part or the boss part can lose the reinforcement effect or the positioning function. The structure described in Patent Document 4 prevents the base of the rib part from having a small thickness and can improve the strength of the rib part. However, the temperature drop rate of a resin during molding is higher in both sides of the rib part in the main body than in the intersection area between the rib part and the main body, thus the generation of a sink mark is insufficiently suppressed, and a fine hollow portion is formed, resulting in a poor appearance of the design surface.

An object of the present invention is to provide a moulded body having a specific cross-sectional structure than can prevent a defect of a sink mark from generating on a design surface of the moulded body corresponding to a rib part, has a small thickness and a large size, and can achieve sufficient strength and rigidity.

Solution to Problem

The inventors of the present invention have focused on that in the main body of a moulded body, the part with a rib where the rib part is formed has a larger amount of a resin than that of the part without a rib where no rib part is formed, by the amount of the resin of the base end of the rib, thus the resin temperature is more slowly dropped in the part with a rib than in the part without the rib when the resin temperature is dropped after molding of the moulded body, and the part without a rib, the temperature of which is dropped more rapidly, is thermally shrunk to pull the resin in the part with a rib, thereby causing a sink mark, have arrived the idea of preventing the sink mark by reducing the difference between the resin temperature drop rate of the part with a rib and the resin temperature drop rata of the part without a rib, and have completed the present invention.

The moulded body having a specific cross-sectional structure pertaining to the present invention is a moulded body having a specific cross-sectional structure, the moulded body includes a rib part standing on a back surface opposite to a design surface of a main body of the moulded body, a reduced thickness part is formed on the back surface of the main body at both sides or one side of the rib part, the ration D/T is 0.975 to 1.07 where D is the diameter of a circle that passes through base ends of both side faces of the rib part and is in contact with the design surface of the main body positioned between the base ends, and T is the thickness of the main body at an outer side of the reduced thickness part, and t<1.3(T−n) is satisfied where t is the thickness of the rib part, and n is the thickness of the reduced thickness part. The moulded body, which has a ration D/T of 0.975 or more, has a sufficient distance between the base ends of both side faces of the rib part and the design surface of the main body, and can maintain sufficient strength and rigidity of the main body at which the rib part is provided. In the present invention, the rib part means, in addition to a plate-like rib standing on the main body of the moulded body, general protrusions protruding from the main body of the moulded body, such as bosses, hooks, and anchors for screws.

In the moulded body, the ratio D/T is 0.975 to 1.07 where D is the diameter of a circle that passes through the base ends of both side faces of the rib part and is in contact with the design surface of the main body positioned between the base ends, and T is the thickness of the main body at an outer side of the reduced thickness part. This configuration reduces the difference in amount of a resin between a part with the rib and a part without the rib in the main body and can reduce the difference in resin temperature drop rate during molding of the moulded body. The configuration thus suppresses or prevents the generation of a sink mark and can prevent the defect of forming a hollow due to the sink mark along the rib formed position on the design surface of the main body, thereby yielding a clear design surface without hollows.

It is preferred that the ratio t/T satisfy $0.08 \leq t/T \leq 0.47$, and the ratio n/T satisfy $0.03 \leq n/T \leq 0.25$ where T is the thickness of the main body, t is the thickness of the rib part, and n is the thickness of the reduced thickness part. Such a configuration more appropriately specifies the thickness of the rib part, the thickness of the reduced thickness part, and the thickness of the main body. This specifying can more effectively prevent the defect of forming a hollow due to the sink mark along the rib formed position on the design surface of the main body, thus yielding a clear design surface without hollow.

It is preferred that the main body have an average thickness Ta of 0.7 to 2.5 mm, the rib part have a thickness t of 0.35 to 0.75 mm, the reduced thickness part be formed within 20.0 mm from the center line of the rib part on both sides of the rib part, the reduced thickness part have a thickness gradually changing width w of 1.0 to 20.0 mm, the reduced thickness part have a maximum reduced thickness depth, n of 0.1 to 0.5 mm, the base of the rib part, continuing from the rib part to the reduced thickness part have a minimum curvature radius r of 0.1 to 1.0 mm. By setting each size of the rib part and parts around the rib part of the moulded body to the above corresponding range, a large moulded body having a small thickness and having a clear design surface without hollows due to sink marks can be achieved while maintaining sufficient strength and rigidity.

It is preferred that the moulded body have a projected area of more than 30,000 $mm^2$, an average thickness Ta of less than 2.5 mm, and an in-plane linear expansion coefficient determined at measurement temperature of −30° C. and +80° C. of $4.0 \times 10^{-5}$/° C. or less. This case can achieve a large moulded body having a projected area of more than 30,000 $mm^2$ but having a small thickness of an average thickness Ta of less than 2.5 mm and excellent dimensional stability with a linear expansion coefficient of $4.0 \times 10^{-5}$/° C.

The material of the moulded body is preferably a resin composition containing a polycarbonate resin in an amount of 40 parts by weight or more and 90 parts by weight or less, at least one resin selected from polyester resins and polyester-polyether copolymer resins in an amount of 5 parts by weight or more and 55 parts by weight or less, and a plate-like filler having a number average major axis length of 0.1 to 40 μm in an amount of 5 parts by weight or more and 55 parts by weight or less. It is preferred that the moulded body be produced by injection molding of the resin composition.

It is preferred that the polyester-polyether copolymer resin be prepared by polymerization with a germanium compound as a catalyst, include an aromatic polyester unit and a modified polyether unit represented by General Formula 1, and have an IV value ranging from 0.30 to 1.00.

General formula 1

[C.1]

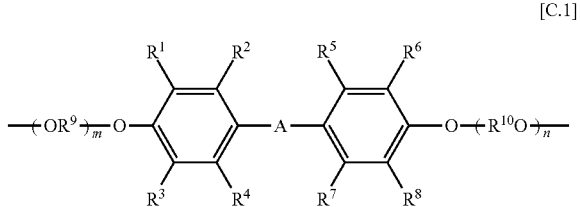

(In the formula, -A- is —O—, —S—, —SO—, —SO$_2$—, —CO—, an alkylene group having 1 to 20 carbon atoms, or an alkylidene group having 6 to 20 carbon atoms; each of R$^1$, R$^2$, R$^3$, R$^4$, R$^5$, R$^6$, R$^7$, and R$^8$ is a hydrogen atom, a halogen atom, or a monovalent hydrocarbon group having 1 to 5 carbon atoms; each of R$^9$ and R$^{10}$ is a divalent hydrocarbon group having 1 to 5 carbon atoms; these groups may the same as or different from each other; m and n are the number of repeating units of the oxyalkylene units; and 10≤m+n≤50)

It is preferred that the aromatic polyester unit be one or more units selected from the group consisting of a polyethylene terephthalate unit, a polybutylene terephthalate unit, and a polypropylene terephthalate unit. In particular, the polyethylene terephthalate unit is most preferred.

It is preferred that the resin composition contain an impact modifier in an amount of 0.5 to 40 parts by weight.

It is preferred that the impact modifier be one or more modifiers selected from the group consisting of multistage graft polymers (1) including 10 to 90% by weight of a core that is one or more rubbery polymers selected from the group consisting of polybutadiens, butadiene-styrene copolymers, butadiene-acrylic ester copolymers, and polyorganosiloxanes and including 10 to 90% by weight of a graft component composed of a polymer obtained by polymerizing one or more monomers selected from the group consisting of aromatic vinyl compounds, vinyl cyanide compounds, and (meth)acrylic ester compounds, in the presence of the core, polyolefin polymers (2), and olefin-unsaturated carboxylic ester copolymers (3).

It is preferred that the moulded body be an automobile part. It is preferred that the automobile part be one or more parts selected from garnishes, pillars, and spoilers. The moulded body having a specific cross-sectional structure of the present invention is applicable to outer covers of cell phones, personal computers, and other devices, various synthetic resin articles, and other products. However, the automobile parts have strict requirements for heat resistance, impact resistance, rigidity, dimensional stability, chemical resistance, moldability, weatherability, thermal stability, and design such as surface gloss and appearance of a moulded body, and thus the moulded body of the present invention can be suitably applied to such automobile parts.

A method for producing the moulded body having a specific cross-sectional structure of the present invention includes injection molding to produce the moulded body for automobile parts.

Advantageous Effects of Invention

The moulded body having a specific cross-sectional structure of the present invention has a ratio D/T of 0.975 to 1.07 where D is the diameter of a circle that passes through base ends of both side faces of the rib part and is in contact with the design surface of the main body positioned between the base ends, and T is the thickness of the main body at an outer side of the reduced thickness part. This configuration reduces the difference in amount of a resin between a part with the rib and a part without the rib in the main body and can reduce the difference in resin temperature drop rate during molding of the moulded body. The configuration thus suppresses or prevents the generation of a sink mark and can prevent the defect of forming a hollow due to the sink mark along the rib formed position on the design surface of the main body, thereby yielding a clear design surface without hollows. The moulded body, which as a ratio D/T of 0.975 or more, has a sufficient distance between the base ends of both side faces of the rib part and the design surface of the main body, and can maintain sufficient strength and rigidity of the main body at which the rib part is provided.

DESCRIPTION OF EMBODIMENTS

Embodiments of the present invention will now be described with reference to drawings.

(Shape of Moulded Body)

Figure 1:
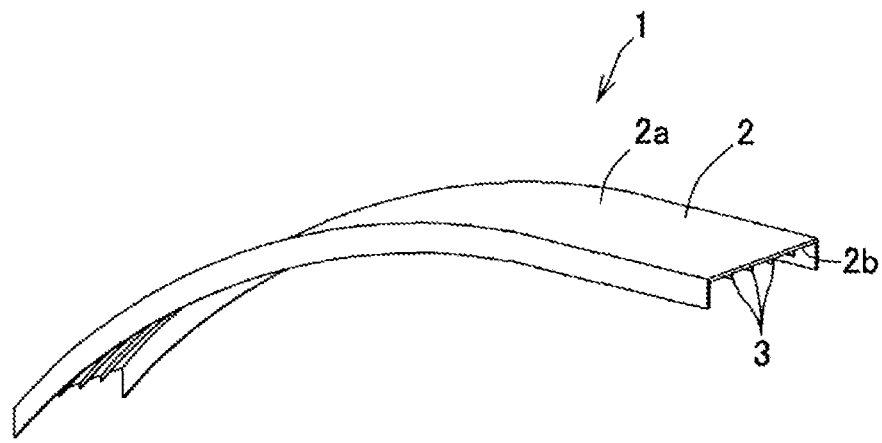
FIG. 1 is a perspective view of a moulded body having a specific cross-sectional shape.
Figure 2:
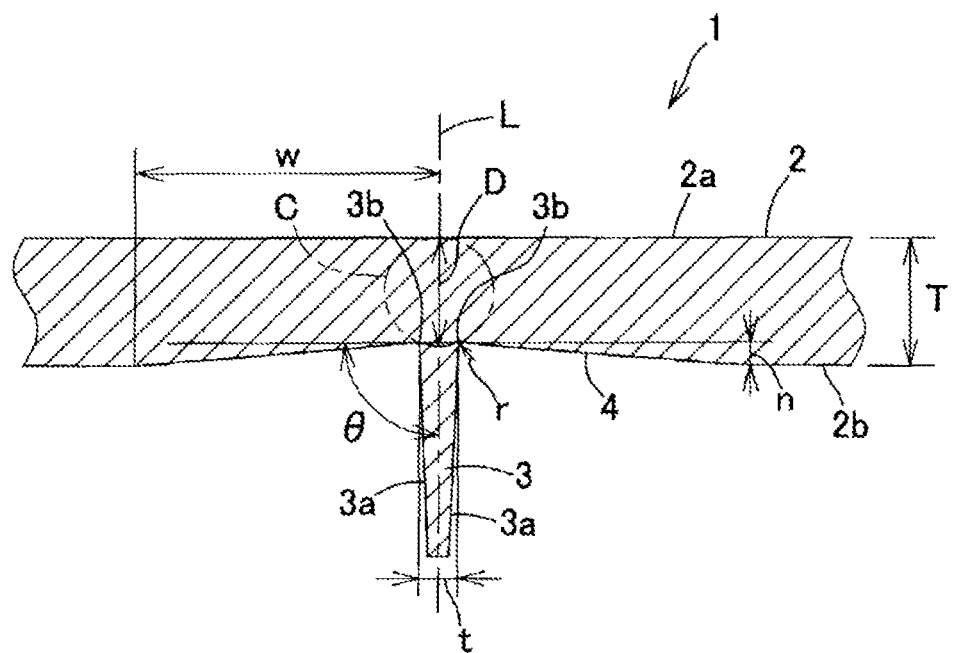
FIG. 2 is a longitudinal sectional view around a rib part of the moulded body having a specific cross-sectional shape.

As shown in FIG. 1 and FIG. 2, a moulded body 1 includes rib parts 3 standing on a back surface 2b opposite to a design surface 2a of a plate-like main body 2. A reduced thickness part 4 is formed on the back surface 2b of the main body 2 at both sides or one side of the rib part 3. The ratio D/T is 0.975 to 1.07, preferably 0.975 to 1.02, where D is the diameter of a circle C that passes through base ends 3b of both side faces 3a of the rib part 3 and is in contact with the design surface 2a of the main body 3 positioned between the base ends 3b, and T is the thickness of the main body 2 at an outer side of the reduced thickness part 4.

The moulded body 1 necessitates a planar or curved plate-like main body 2 and rib parts 3 standing on the back surface 2b of the main body 2, but the shape and the size of the main body 2 and the number and the size of the rib parts 3 can be appropriately designed according to an intended application of the moulded body 1. The moulded body 1 is applicable as a moulded body for automobiles, household appliances, furniture, and articles. In particular, the moulded body 1 has excellent heat resistance, impact resistance, rigidity, dimensional stability, chemical resistance, moldability, weatherability, thermal stability, surface gloss, and appearance and can be lightweight. Hence, the moulded body 1 is preferably used for automobile parts such as garnishes, pillars, and spoilers.

The moulded body 1 can be produced by injection molding or extrusion molding. The injection molding is preferred because a complicated shape can be produced. A large moulded body having a small thickness can be molded when the resin composition described later is used. Here, the large moulded body having a small thickness means a moulded body 1 having a projected area of more than 30,000 mm$^2$ and an average thickness Ta of less than 2.5 mm. More specifically the moulded body preferably has a projected area of 30,000 mm$^2$ to 7,000,000 mm$^2$ and more preferably a projected area of 50,000 mm$^2$ to 4,000,000 mm$^2$.

The rib part 3 is preferably shaped into a long, thin plate along the length direction of the main body 2 and preferably stands on the back surface 2b of the main body 2. In the present embodiment, although the present invention is applied to the moulded body 1 having such long, thin plate-like rib parts 3, the present invention can be applied to moulded bodies having protrusions protruding from the main body of the moulded body, such as bosses, hooks, and anchors for screws, in a similar manner. In the present embodiment, the protrusions protruding from the main body of the moulded body, including bosses, hooks, and anchors for screws, are collectively called the rib part.

The ratio D/T is 0.975 to 1.07, preferably 0.975 to 1.02, where D is the diameter of a circle C that passes through base ends 3b of both side faces 3a of the rib part 3 and is in contact with the design surface 2a of the main body 2 positioned between the base ends 3b, and T is the thickness of the main body 2 at an outer side of the reduced thickness part 4. This configuration reduces the difference in amount of a resin between a part with the rib and a part without the rib in the main body 2 and can reduce the difference in resin temperature drop rate during molding of the moulded body 1. The configuration thus suppresses or prevents the generation of a sink mark and can prevent the defect of forming a hollow due to the sink mark along a formation position of the rib part 3 on the design surface 2a of the main body 2, thereby yielding a molded product 1 having a clear design surface 2a without hollows. If having a ratio D/T of less than 0.975, the moulded body 1 has an excessively small distance between the base ends 3b of both the side faces 3a of the rib part 3 and the design surface 2a of the main body 2. This reduces the strength and rigidity of the main body 2 at a position with the rib part 3 and generates a sink mark. If the ratio D/T is more than 1.07, a sink mark is generated. Hence, the ratio D/T is preferably 0.975 to 1.07.

The ratio t/T satisfies $0.08 \leq t/T \leq 0.47$, preferably $0.12 \leq t/T \leq 0.45$, more preferably $0.25 \leq t/T \leq 0.45$, and particularly preferably $0.28 \leq t/T \leq 0.36$, where t is the thickness of the rib part 3, and T is the thickness of the main body 2 at an outer side of the reduced thickness part 4. The ratio n/T can satisfy $0.03 \leq n/T \leq 0.25$ where n is the maximum reduced thickness depth of the reduced thickness part 4, and T is the thickness of the main body 2. The lower limit of the ratio n/T is preferably 0.05, more preferably 0.08, even more preferably 0.10, and particularly preferably 0.12. The upper limit of the ration n/T is preferably 0.19, and more preferably 0.16. The appropriate setting of the ratio t/T and the ratio n/T as above enables the production of a molded product 1 having a clear design surface 2a without hollows due to sink marks.

The thickness t of the rib part 3 is 0.25 mm or more and the thickness T or less, preferably 0.35 mm or more and (2/3)T or less, more preferably 0.45 mm or more and (1/2)T or less, and even more preferably 0.55 mm or more and (1/2.5)T or less.

As for the specific size of each part of the molded product, the average thickness Ta of the main body 2 except the formation position of the rib part 3 is 0.7 mm or more and less than 2.5 mm, preferably 0.9 mm or more, more preferably 1.1 mm or more, even more preferably 1.6 mm or more, further preferably 1.9 mm or more, and preferably less than 2.2 mm because an excessively small thickness gives insufficient strength, and an excessively large thickness increases the weight of the molded product. The thickness T of the main body 2 at an outer side of the reduced thickness part 4 is substantially the same as Ta because an excessively small thickness gives insufficient strength, and an excessively large thickness increases the weight of the molded product.

The thickness t of the rib part 3 is 0.25 to 0.9 mm, preferably 0.35 mm or more, more preferably 0.45 mm or more, even more preferably 0.51 mm or more, and preferably 0.75 mm or less. The minimum curvature radius r of the base end 3b of each side face 3a of the rib part 3, continuing from the rib part 3 to the reduced thickness part 4, is 0.1 to 1.0 mm, preferably 0.2 mm or more, more preferably 0.35 mm or more, preferably 0.9 mm or less, and more preferably 0.75 mm or less. The angle θ between the main body 2 and the rib part 3 is 10° to 170° and preferably 20° to 160°.

The reduced thickness part 4 is preferable formed at both sides of the rib part 3 on the back surface 2b of the main body 2, but may be formed at one side of the rib part 3 on the back surface 2b of the main body 2. The reduced thickness part 4 is formed within 20.0 mm, preferably within 15 mm, and more preferably within 10 mm from the center line L of the rib part 3 on both sides of the rib part 3. The reduced thickness part 4 has a thickness gradually changing width w of 1.0 to 20.0 mm, preferably 3.0 mm to 15.0 mm, and more preferably 5.0 mm to 10.0 mm in the main body 2. The reduced thickness part 4 has a maximum reduced thickness depth n of 0.1 to 0.5 mm and preferably 0.2 mm to 0.4 mm. In the present embodiment, the thickness gradually changing part in the reduced thickness part 4 is formed over the full width of the reduced thickness part 4, but may be formed apart from the rib part 3 in a partial area in the width direction of the reduced thickness part 4. The thickness gradually changing part has an inclined back surface, but may have a curved back surface.

The moulded body 1 has an in-plane linear expansion coefficient determined at measurement temperature of −30° C. and +80° C. of $4.0 \times 10^{-5}$/° C. or less and $3.5 \times 10^{-5}$/° C. or more.

(Resin Composition)

Next, a resin composition preferable for the moulded body 1 will be described.

A resin composition of the moulded body of the present invention contains a polycarbonate resin in an amount of 40 parts by weight or more and 90 parts by weight or less, at least one resin selected from polyester resins and polyester-polyether copolymer resins in an amount of 5 parts by weight or more and 55 parts by weight or less, and a plate-like filler having a number average major axis length of 0.1 to 40 μm in an amount of 5 parts by weight or more and 55 parts by weight or less. In terms of the balance of impact resistance, heat resistance, dimensional stability, chemical resistance, and moldability, the amount of the polycarbonate resin is preferably 50 parts by weight or more and 90 parts by weight or less and more preferably 60 parts by might or more and 80 parts by weight or less. The amount of the at least one resin selected from polyester resins and polyester-polyether copolymer resins is preferably 10 parts by weight or more and 50 parts by weight or less and more preferably 20 parts by weight or more and 40 parts by weight or less. The number average major axis length of the plate-like filler is preferably 0.1 μm to 30 μm and more preferably 0.1 to 25 μm. The amount of the plate-like filler is preferably 10 parts by weight or more and 49 parts by weight or less and more preferably 15 parts by weight or more and 40 parts by weight or less.

The resin composition of the present invention preferably, further contains an impact modifier in an amount of 0.5 to 40 parts by weight in order to further improve the impact resistance. The amount is more preferably 1 to 20 parts by weight in terms of heat resistance, rigidity, moldability, and other characteristics, and even more preferably 2 to 10 parts by weight in order to provide the impact strength and the heat resistance required for vehicle parts, which are preferred application of the moulded body of the resin composition of the present invention, when the moulded body is used for such applications.

The impact modifier is preferably one or more modifiers selected from the group consisting of multistage graft polymers (1), polyolefin polymers (2), olefin-unsaturated carboxylic ester copolymers (3), and thermoplastic polyester elastomers.

The multistage graft polymer (1) preferably includes 10 to 90% by weight of one or more rubbery polymers selected from the group consisting of polybutadienes, butadiene-styrene copolymers, butadiene-acrylic ester copolymers, and polyorganosiloxanes and 10 to 90% by weight of a graft component composed of a polymer obtained by polymerizing one or more monomers selected from the group consisting of aromatic vinyl compounds, vinyl cyanide compounds, and (meth)acrylic ester compounds, in the presence of the rubbery polymer.

The resin composition of the present invention preferably, further contains a stabilizer in an amount of 0.01 to 4 parts by weight and more preferably 0.1 to 2 parts by weight in order to prevent thermal decomposition during a molding process.

The stabilizer is preferably one or more stabilizers selected from the group consisting of phenol stabilizers, phosphoric stabilizers, and sulfuric stabilizers. These stabilizers are preferably used in combination due to excellent flame resistance.

The phosphoric stabilizer is more preferably phosphite stabilizers such as tris(2,4-di-t-butylphenyl) phosphite (for example, ADK STAB 2112 (registered trademark) manufactured by Asahi Denka).

The phenol stabilizer is more preferably hindered phenol stabilizers such as pentaerythritol tetrakis[3,5-di-t-butyl-4-hydroxyphenyl) propionate (for example, Irganox 1010 (registered trademark) manufactured by Ciba Specialty Chemicals).

(Polycarbonate Resin)

The polycarbonate resin used in the present invention is a polycarbonate resin derived from a compound (hereinafter called divalent phenol) having two phenolic hydroxy groups and is typically a resin prepared by reaction of the divalent phenol with phosgene or of the divalent phenol with a carbonate diester.

The divalent phenol is particularly preferably bisphenol A, but is not limited to this.

As for the molecular weight, the polycarbonate resin preferably has a viscosity average molecular weight ranging from 10,000 to 60,000 in terms of impact resistance, chemical resistance, moldability, and other characteristics.

(Polyester Resin)

The polyester resin pertaining to the present invention is a resin containing a unit prepared by polycondensation of a dicarboxylic acid with a diol, in an amount of 90% bt weight or more, and is exemplified by polyethylene terephthalate (PET), polybutylene terephthalate (PBT), and phthalic acid polyester. The phthalic acid polyester is preferred, and is exemplified by Polycizer A55 (registered trademark) manufactured by DIC Corporation. The polyester resin of the present invention is preferably produced with a germanium compound as with the catalyst used for producing the polyester-polyether copolymer described later.

(Polyester-Polyether Copolymer)

the polyester-polyether copolymer pertaining to the present invention is preferably a polymer including an aromatic polyester unit in an amount of 85 to 65% by weight and a modified polyether unit represented by General Formula 1 in an amount of 15 to 35% by weight, and is more preferably a polymer including the aromatic polyester unit in an amount of 80 to 70% by weight and the modified polyether unit in an amount of 20 to 30% by weight, in terms of moldability improving effect and maintaining of heat resistance.

The polyester-polyether copolymer may have any molecular weight and typically preferably has such a molecular weight that the logarithmic viscosity number (IV) ranges from 0.3 to 1.0 and more preferably from 0.45 to 0.60 at a concentration of 0.5 g/dl in a mixed solvent of tetrachloroethane and phenol with a weight ratio of 50/50 at 25° C.

Examples of the method for producing the polyester-polyether copolymer include (1) direct esterification of three compounds of an aromatic dicarboxylic acid, a diol, and a modified polyether with a germanium compound as a catalyst, (2) transesterification of three compounds of a dialkyl aromatic dicarboxylate, a diol, a modified polyether, and/or a modified polyether ester with a germanium compound as a catalyst, (3) polycondensation by addition of a modified polyether during or after transesterification of a dialkyl aromatic dicarbosylate and a diol with a germanium compound as a catalyst, and (4) mixing a polymer of an aromatic polyester with a modified polyether and then transesterifying the melted mixture under reduced pressure with a germanium compound as a catalyst.

As described later in comparative examples, if an antimony compound is used as the catalyst for producing the polyester-polyether copolymer, the antimony compound remaining in a composition decomposes the polycarbonate resin to generate carbon dioxide gas during heating for molding or the like, and consequently silver streaks or voids is generated on the surface of a moulded body produced.

As the catalyst for producing the polyester-polyether copolymer, the inventors of the present invention have selected a germanium compound, which has activity substantially the same or higher than that of the antimony compound but does not hydrolyze the polycarbonate resin, where the hydrolysis is the problem caused by the antimony compound.

Examples of such a germanium compound used as the catalyst pertaining to the present invention include germanium oxides such as germanium dioxide, germanium alkoxides such as germanium tetraethoxide and germanium tetraisopropoxide, germanium hydroxide and alkali metal salts thereof, germanium compounds are used singly or in combination of two or more of them. Among these germanium compounds, germanium dioxide is particularly preferred.

The amount of germanium dioxide added as the catalyst for polymerization is preferably 1,000 ppm or less for economic reasons.

The aromatic dicarboxylic acid is particularly preferably terephthalic acid, and other examples include isophthalic acid, diphenyldicarboxylic acid, and diphenoxyethane dicarboxylic acid. In addition to these aromatic dicarboxylic acids, another aromatic oxycarboxylic acid such as oxybenzoic acid or an aliphatic or alicyclic dicarboxylic acid such as adipic acid, sebacic acid, and cyclohexane 1,4-dicarboxylic acid may be used in combination at a small ratio (15% or less).

The diol is a low molecular weight glycol component to form the ester unit, and is exemplified by low molecular weight glycols having 2 to 10 carbon atoms, such as ethylene glycol, trimethylene glycol, tetramethylene glycol, hexanediol, decanediol, and cyclohexanedimethanol. In particular, ethylene glycol, trimethylene glycol, and tetramethylene glycol are preferred in terms of easy availability.

The alkyl group of the dialkyl aromatic dicarbosylate is preferably a methyl group in terms of transesterification reactivity.

As the solution viscosity of the aromatic polyester as the polymer, the logarithmic viscosity number (IV) preferably ranges from 0.3 to 1.0 and more preferably from 0.45 to 0.60 at a concentration of 0.5 g/dl in a mixed solvent of phenol and tatrachloroethane with a weight ratio of 1/1 at 25° C. in terms of the impact resistance, the chemical resistance, or the moldability of a molded product produced.

(Modified Polyether Unit)

The modified polyether unit pertaining to the present invention is a unit represented by General Formula 1. As for the numbers, m and n, of repeating units of the oxyalkylene unit in General Formula 1, the number average of (m+n) is preferably 10 or more, more preferably 20 or more, and even more preferably 25 or more because a polymer having a number average of 8 or less achieves insufficient improvement of the thermal stability.

(Aromatic Polyester Unit)

The aromatic polyester unit used in the present invention is a polymer or a copolymer prepared from an aromatic dicarboxylic acid or an ester-forming derivative thereof and a diol or an ester-forming derivative thereof, and is typically an alternate polycondensation product.

Preferred examples of the aromatic polyester unit specifically include polyethylene terephthalate, polyethylene terephthalate copolymers, polytetramethylene terephthalate, polytetramethylene terephthalate copolymers, polytrimethylene terephthalate, and polytrimethylene terephthalate copolymers. The unit is more preferably one or more units selected from the group consisting of a polyethylene terephthalate unit, polybutylene terephthalate, and a polypropylene terephthalate unit.

(Multistage Graft Polymer)

The multistage graft polymer is prepared by graft polymerization of a rubbery elastic body with a vinyl compound.

The rubbery elastic body preferably has a glass transition temperature of 0° C. or less and more preferably −40° C. or less.

Examples of such a rubbery elastic body specifically include diene rubbers such as polybutadiene, butadiene-styrene copolymers, butadiene-acrylic ester copolymers, and butadiene-acrylonitrile copolymers, acrylic rubbers such as polybutyl acrylate, poly-2-ethylhexyl acrylate, dimethyl siloxane-butyl acrylate rubbers, and silicon/butyl acrylate composite rubbers, olefinic rubbers such as ethylene-propylene copolymers and ethylene-propylene-diene copolymers, polydimethylsiloxane rubbers, and dimethylsiloxane-diphenylsiloxane copolymer rubbers. Specific rubbers of the butadiene-acrylic ester copolymer are exemplified by butadiene-butyl acrylate copolymers and butadiene-2-ethylhexyl acrylate copolymers. In terms of impact resistance, polybutadiene, butadiene-styrene copolymers, butadiene-butyl acrylate copolymers are preferably used.

Among the butadiene-butyl acrylate copolymers, a copolymer composed of 50 to 70% by weight of butyl acrylate and 30 to 50% by weight of butadiene is preferred in terms of weatherability and impact resistance.

The rubbery elastic body may have any average particle size, and the average particle size is preferably 0.05 to 2.00 µm and more preferably 0.1 to 0.4 µm. The gel content is not particularly limited, but the rubbery elastic body to be used preferably has a gel content 10 to 99% by weight and more preferably 80 to 96% by weight.

A multistage graft polymer prepared by using an organophosphorus emulsifier is particularly preferably used.

Examples of the vinyl compound used for the preparation of the multistage graft polymer include aromatic vinyl compounds, vinyl cyanide compounds, acrylic esters, and methacrylic esters. These compounds may be used singly or in combination of two or more of them. Examples of the aromatic vinyl compound particularly preferably include styrene and α-methylstyrene. Examples of the vinyl cyanide compound particularly preferably include acrylonitrile and methacrylonitrile. Examples of the acrylic ester particularly preferably include butyl acrylate and 2-ethylhexyl acrylate. Examples of the methacrylic ester particularly preferably include methyl methacrylate.

As for the ratio of the rubbery elastic body and the vinyl compound used to prepare the core/shell graft polymer, the vinyl compound is preferably used in a ratio of 90 to 10% by weight or 15 to 70% by weight with respect to 10 to 90% by weight or 30 to 85% by weight of the rubbery elastic body. A polymer containing the rubbery elastic body in a ratio of less than 10% by weight is likely to have a lower impact resistance, and a polymer containing the rubbery elastic body in a ratio of more than 90% by weight is likely to have a lower heat resistance.

(Plate-Like Filler)

The plate-like filler pertaining to the present invention is a component for reducing the linear expansion of the moulded body of the resin composition of the present invention, and is an alkaline inorganic substance mainly containing silica or alumina. Examples of the shape of the plate-like filler include a planar shape, a flaky shape, and a scaly shape. The filler is required to have a number average major axis length (length of a maximum straight line contained in the filler) of 0.1 to 40 µm and preferably has a number average major axis length of 0.1 to 25 µm in terms of low linear expansion characteristics and surface appearance of the molded product. The filler preferably has a number average aspect ratio, or a ratio of major axis length of filler per filler thickness (length of a straight line perpendicular to a maximum flat face including the maximum straight line contained in the filler) of 10 or more and more preferably 15 or more in terms of low linear expansion characteristics and impact strength. The number average major axis length and the number average aspect ratio are number averages of values of the filler determined under a stereoscopic microscope.

The plate-like filler pertaining to the present invention is preferably one or more fillers mainly containing silica or alumina, selected from the group consisting of mica, talc, montmorillonite, sericite, kaolin, glass flakes, plate-like alumina, and synthetic hydrotalcite in order to disperse each component in the moulded body. In terms of the dimensional stability improvement effect of the present invention, mica, talc, montmorillonite, sericite, kaolin, and glass flakes are more preferred. In terms of the balance of impact resistance, flowability, and product appearance, mica, talc, and glass flakes are more preferred, and mica is particularly preferred.

The mica may be either a natural product or a synthetic product, and may be any of muscovite, biotite, and phlogopite.

(Additive)

The resin composition of the present invention can contain light stabilizers, flame retardants, plasticizers, lubricants, release agents, ultraviolet absorbers, antistatic agents, pigments and dyes, inorganic fillers, acrylonitrile-styrene copolymers, polyethylene terephthalate, polybutylene terephthalate, and other additives.

(Kneading)

The resin composition of the present invention can be produced by any method. For example, the resin composition can be produced by mixing with a blender, a super mixer, or another mixer or by kneading with a single- or multi-screw extruder or another machine.

(Molding Method)

The resin composition of the present invention can be molded by any method. For example, the resin composition can be molded by injection molding, extrusion molding, blow molding, compression molding, or another molding method.

Example 1

The resin composition of the present invention will next be specifically described with reference to examples.

polymerization were placed. The mixture was maintained at 190° C. for 2 hours. The temperature was then gradually increased and the mixture was simultaneously, gradually decompressed with a vacuum pump to undergo polycondensation at a final temperature of 270° C. and a final pressure of 1 torr. When the degree of polymerization reached a predetermined value, the decompression was stopped to terminate the reaction. Polyester-polyether copolymer B12 produced was isolated. The strands cooled in a water bath were simultaneously post-crystallized and dried in a hot-air drier set at 100° C. The crystallized strands were then put in a pulverizer to yield pellets. Consequently, polyester-polyether copolymer B12 was obtained in pellet form. The obtained polyester-polyether copolymer has a polyether ratio of 25 wt % and an IV value of 0.49.

TABLE 1

|  | B1 | B2 | B3 | B4 | B5 | B6 | B7 | B8 | B9 | B10 | B11 | B12 |
|---|---|---|---|---|---|---|---|---|---|---|---|---|
| PET |  | 80 |  |  | 75 |  |  | 70 | 70 | 70 | 70 |  |
| BHET |  |  |  |  |  |  |  |  |  |  |  | 80 |
| 18EN |  |  |  |  |  |  |  |  |  | 30 |  |  |
| 30EN |  | 20 |  |  | 25 |  |  | 30 | 30 |  |  | 20 |
| 60EN |  |  |  |  |  |  |  |  |  |  | 30 |  |
| IV value | 0.15 | 0.60 | 1.00 | 0.45 | 0.60 | 1.00 | 1.20 | 0.45 | 1.20 | 0.80 | 0.60 | 0.49 |

In the following measurement conditions, examples, and the like, "part" and "%" mean "part by weight" and "% by weight", respectively.

First, the materials used and measurement conditions will be described below.

(Polycarbonate Resin)

The polycarbonate resin used was TARFLON A2200 (registered trademark) having a viscosity average molecular weight of 22,000 manufactured by Idemitsu Kosan Co., Ltd. It is represented as PC (A-1) in Table 2.

(Polyester-Polyether Copolymers: B1 to B11)

In a reaction vessel equipped with a stirrer and a gas outlet, polyethylene terephthalate (IV=0.65) prepared with a germanium catalyst, the modified polyether shown in Table 1, 400 ppm of germanium dioxide, and 2,000 ppm of a stabilizer (Irganox 1010 manufactured by Ciba Specialty Chemicals) on the basis of the total amount of the polyethylene terephthalate and the modified polyether were placed. The mixture was maintained at 270° C. for 2 hours, and then the pressure inside of the reaction vessel is reduced with a vacuum pump to undergo polycondensation at 1 torr. When the degree of polymerization reached a predetermined value, the pressure reduction was stopped to terminate the reaction. Various polyester-polyether copolymers B1 to B11 produced were isolated. The strands cooled in a water bath were simultaneously post-crystallized and dried in a hot-air drier set at 100° C. The crystallized strands were then put in a pulverizer to yield pellets. Consequently, polyester-polyether copolymers B1 to B11 were obtained in pellet form. B9 was produced in accordance with the method described in Patent Document 1 and had an IV value of 1.20.

(Polyester-Polyether Copolymer: B12)

In a reaction vessel equipped with a stirrer and a gas outlet, bishydroxyethylene terephthalate (BHET) as a raw material of polyethylene terephthalate, the modified polyether shown in Table 1, 600 ppm of germanium dioxide, and 3,000 ppm of a stabilizer (Irganox 1010 manufactured by Ciba Specialty Chemicals) on the basis of a theoretical yield of the polyester-polyether copolymer to be obtained by In Table 1, PET is a polyethylene terephthalate polymerized with a germanium catalyst and having an IV of 0.65. The bishydroxyethylene terephthalate (BHET) used was BHET manufactured by Petrefinetechnology Co., Ltd. Bisol 18EN has the structure of General Formula 1, where the number average of (m+n) is 18, Bisol 30EN has the structure of General Formula 1, where the number average of (m+n) is 30, and Bisol 60EN has the structure of General Formula 1, where the number average of (m+n) is 60.

The IV value in Table 1 was calculated from a logarithmic viscosity number at a concentration of 0.5 g/dl determined in a mixed solvent of tetrachloroethane and phenol with a weight ratio of 50/50 at 25° C.

(Polyester-Polyether Copolymer: B13)

Dimethyl terephthalate and 1,4-butanediol were polycondensed, and then dimethyl terephthalate was added to terminate the polymerization, giving polybutylene terephthalate having carboxylic methyl ester at both ends (melting point: 200° C.). Next, poly(tetramethyleneoxide)glycol (number average molecular weight: 1,500) was added to be polymerized, giving polyester elastomer (B13) having a mass ratio of polybutylene terephthalate/poly(tetramethyleneoxide)glycol of 50/50.

(Graft Copolymer)

Kane Ace M732 manufactured by Kaneka Corporation (Inorganic Filler: D)

Muscovite mica A-21S having a number average major axis length of 27 μm: Yamaguchi Mica Co., Ltd.

(Stabilizer: E-1)

Irganox 1010 (hindered phenol) manufactured by Ciba Specialty Chemicals (Stabilizer: E-2)

ADK STAB PEP-36 (phosphite) manufactured by ADEKA CORPORATION (Phosphorus Flame Retardant: F)

PX-200 (aromatic condensed phosphoric acid ester) manufactured by Daihachi Chemical Industry Co., Ltd.

(Izod Impact Value)

Determined in accordance with ASTM D-256 using a ¼-inch sample with a notch at 23° C.

(Heat Resistance)

Determined in accordance with ASTM D-696.

(Appearance after Retention Test)

A planar moulded body with a size of 120×120×3 mm was molded with an injection molding machine FN-1000 manufactured by Nissei Plastic Industrial Co., Ltd. at a cylinder temperature of 280° C., a mold temperature of 80° C., and a retention time of 2 minutes, and the appearance was visually observed and evaluated on the basis of the following standard.

○: Almost no flash is observed on the surface.
Δ: Some flashes are observed on the surface.
x: Flashes are remarkably observed on the surface.

(Evaluation of Moldability of Large Product with Small Thickness)

Three test pieces each having a size of 600 mm×100 mm and having a thickness of 2.5 mm, 2.0 mm, and 1.5 mm were prepared as automobile panel parts that were the large injection molded product, and the panel parts were visually observed and evaluated on the basis of the following standard. If an automobile panel part filled with a resin to the ends and having a smaller thickness has a better surface appearance, the material is considered to have excellent thin-wall moldabilty.

○: A moulded body is filled with a resin to the ends and has a surface with almost no flash.

Δ: A moulded body is filled with a resin to the ends and has a surface with some flashes.

x: A moulded body is filled with a resin to the ends and has a surface with remarkable flashes.

xx: A moulded body is not filled with a resin to the ends.

(Evaluation of Linear Expansion Characteristics)

The moulded body produced by the above method was cooled at −30° C. and the size of the moulded body was determined. The same moulded body was heated to +80° C. and the size of the moulded body was determined at the temperature. The linear expansion coefficient was calculated and evaluated.

Production Examples 1 to 21

A polycarbonate resin, polyester-polyether copolymers B-1 to B-12, a polyethylene terephthalate resin (PET) polymerized with a germanium catalyst and having an IV value of 0.65, an impact modifier, a reinforcement, a phosphite stabilizer, a hindered phenol stabilizer, and a phosphorus flame retardant were preliminary mixed at the ratios shown in Table 2 and Table 3. Each mixture was melted and kneaded with a twin screw extruder at 280° C., yielding pellets. The obtained pellets were used to prepare a test piece with an injection molding machine FN-1000 manufactured by Nissei Plastic Industrial Co., Ltd. at a cylinder temperature of 280° C. and a mold temperature of 80° C. The prepared test piece was evaluated by the above method. Table 2 and Table 3 show the results.

TABLE 2

| | | Production Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| PC | | 70 | 70 | 70 | 70 | 70 | 60 | 80 | 70 | 70 | 70 | 70 | 70 |
| B1 | | 30 | | | | 30 | | 20 | | | | | |
| B2 | | | 30 | | | | | | | | | | |
| B3 | | | | 30 | | | | | | | | | |
| B4 | | | | | 30 | | 40 | | 30 | | | | |
| B5 | | | | | | | | | | 30 | | | |
| B6 | | | | | | | | | | | 30 | | |
| B7 | | | | | | | | | | | | | |
| B8 | | | | | | | | | | | | | |
| B9 | | | | | | | | | | | | | |
| B10 | | | | | | | | | | | | | |
| B11 | | | | | | | | | | | | | |
| B12 | | | | | | | | | | | | 30 | |
| PET | | | | | | | | | | | | | 30 |
| Graft copolymer | | | | | | 3 | | | | | | | 5 |
| (D) | | 20 | 20 | 20 | 20 | 20 | 20 | 20 | 35 | 20 | 20 | 20 | 20 |
| (E-1) | | 0.2 | 0.2 | 0.2 | 0.2 | 0.2 | 0.2 | 0.2 | 0.2 | 0.2 | 0.2 | 0.2 | 0.2 |
| (E-2) | | 0.3 | 0.3 | 0.3 | 0.3 | 0.3 | 0.3 | 0.3 | 0.3 | 0.3 | 0.3 | 0.3 | 0.3 |
| (F) | | | | | | | | | | | | | 20 |
| Spiral (2 mm) | mm | 575 | 540 | 585 | 531 | 510 | 550 | 500 | 520 | 510 | 510 | 510 | 580 |
| HDT (low load) | ° C. | 123 | 122 | 121 | 121 | 122 | 120 | 126 | 124 | 127 | 126 | 122 | 82 |
| IZOD (with a notch) | J/m | 44 | 46 | 43 | 55 | 64 | 41 | 68 | 49 | 51 | 56 | 68 | 31 |
| Appearance after retention test | 2 min | ○ | ○ | ○ | ○ | ○ | ○ | ○ | ○ | ○ | ○ | ○ | ○ |
| Surface appearance of molded product (2.5 mm · thick panel part) | | ○ | ○ | ○ | ○ | ○ | ○ | ○ | ○ | ○ | ○ | ○ | ○ |
| Surface appearance of molded product (2.0 mm · thick panel part) | | ○ | ○ | ○ | ○ | ○ | ○ | ○ | ○ | ○ | ○ | ○ | ○ |
| Surface appearance of molded product (1.5 mm · thick panel part) | | ○ | ○ | ○ | ○ | ○ | ○ | ○ | ○ | ○ | ○ | ○ | ○ |
| Linear expansion coefficient MD direction | | 3.4 | 3.5 | 3.3 | 3.5 | 3.2 | 3.8 | 3.4 | 3.1 | 3.5 | 3.7 | 3.5 | 3.6 |
| Linear expansion coefficient TD direction | | 3.5 | 3.0 | 3.1 | 3.7 | 3.3 | 3.9 | 3.5 | 3.3 | 3.8 | 3.8 | 3.8 | 3.9 |

TABLE 3

| | | Production Example | | | | | | | | |
|---|---|---|---|---|---|---|---|---|---|---|
| | | 13 | 14 | 15 | 16 | 17 | 18 | 19 | 20 | 21 |
| PC | | 70 | 70 | 60 | 55 | 96 | 70 | 70 | 70 | 70 |
| B1 | | | | | | | | | | |
| B2 | | | | | | 4 | | | | |
| B3 | | | | | | | | | | |
| B4 | | | | | 45 | | 30 | | | |
| B5 | | | | | | | | | | |
| B6 | | | | | | | | | | |
| B7 | | 30 | | | | | | | | |
| B8 | | | 30 | | | | | | | |
| B9 | | | | 20 | | | | | | |
| B10 | | | | | | | | 30 | | |
| B11 | | | | | | | | | 30 | |
| B12 | | | | | | | | | | |
| PET | | | | 20 | | | | | | 30 |
| Graft copolymer | | | | 5 | | | | | | |
| (D) | | 20 | 20 | 20 | 20 | 20 | 50 | 25 | 20 | 20 |
| (E-1) | | 0.2 | 0.2 | 0.2 | 0.2 | 0.2 | 0.2 | 0.2 | 0.2 | 0.2 |
| (E-1) | | 0.3 | 0.3 | 0.3 | 0.3 | 0.3 | 0.3 | 0.3 | 0.3 | 0.3 |
| (F) | | | | | | | | | | |
| Spiral (2 min) | mm | 480 | 565 | 440 | 571 | 400 | 490 | 525 | 500 | 335 |
| HDT (low load) | °C. | 127 | 115 | 123 | 118 | 125 | 126 | 127 | 114 | 135 |
| IZOD (with a notch) | J/m | 55 | 71 | 80 | 41 | 68 | 38 | 52 | 61 | 66 |
| Appearance after retention test | 2 min | ○ | ○ | ○ | ○ | ○ | x | ○ | x | ○ |
| Surface appearance of molded product (2.5 mm · thick panel part) | | ○ | ○ | ○ | ○ | Δ | ○ | ○ | x | xx |
| Surface appearance of molded product (2.0 mm · thick panel part) | | ○ | ○ | ○ | x | xx | x | x | x | xx |
| Surface appearance of molded product (1.5 mm · thick panel part) | | x | x | x | x | xx | x | x | x | xx |
| Linear expansion coefficient MD direction | | 3.6 | 3.5 | 3.5 | 4.1 | 3.3 | 2.9 | 3.2 | 4.8 | 3.5 |
| Linear expansion coefficient TD direction | | 3.6 | 3.7 | 3.5 | 4.3 | 3.4 | 3.2 | 3.3 | 5.0 | 3.6 |

Examples 1 to 8, Comparative Examples 1 to 4

The resin composition of Production Example 5 was molded with an injection molding machine FE360S100ASE manufactured by Nissei Plastic industrial Co., Ltd. at a cylinder temperature of 280° C. and a mold temperature of 80° C., yielding an automobile panel part having a size of 600 mm×100 mm, or the large injection molded product having the rib structure shown in Table 4 and Table 5 as a test piece, and the moldability was evaluated. The part was coated with paint and then was visually observed whether sink marks were present or not. The evaluation standard was shown below. Table 4 and Table 5 also show the prediction results of sink marks calculated with CAE simulation, Mold-Flow.

Moldability

○: Ribs are completely filled with a resin composition.

x: Ribs are not completely filled with a resin composition (short shot),

Evaluation of Sink Mark

○: No sink mark is visually observed.

Δ: Sink marks are observed only when a test piece is magnified four times.

x: Sink marks are visually observed.

Table 4 and Table 5 show the results of Examples and Comparative Examples.

TABLE 4

| | | Examples for shape patent | | | | | | | |
|---|---|---|---|---|---|---|---|---|---|
| | | Example | | | | | | | |
| | | 1 | 2 | 3 | 4 | 5 | 6 | 7 | 8 |
| Moulded body | Resin composition | Production Example 5 | Production Example 5 | Production Example 5 | Production Example 5 | Production Example 5 | Production Example 5 | Production Example 5 | Production Example 5 |
| | Thickness of main body: T (mm) | 2 | 2 | 2 | 2 | 2 | 2 | 2.5 | 2.5 |
| Rib design | Rib thickness: t (mm) | 0.7 | 0.7 | 0.7 | 0.7 | 0.5 | 0.9 | 0.7 | 0.9 |
| | Thickness of reduced thickness part: n (mm) | 0.5 | 0.3 | 0.2 | 0.1 | 0.3 | 0.3 | 0.2 | 0.3 |
| | Rib base: R (mm) | 1 | 0.5 | 0.5 | 0.5 | 0.6 | 0.5 | 0.5 | 0.5 |
| | Diameter of inscribed circle D (mm) | 2.04 | 1.97 | 2.06 | 2.14 | 1.95 | 2.04 | 2.52 | 2.49 |

TABLE 4-continued

Examples for shape patent

| | | Example | | | | | | | |
|---|---|---|---|---|---|---|---|---|---|
| | | 1 | 2 | 3 | 4 | 5 | 6 | 7 | 8 |
| Characteristic part | Ratio D/T | 1.02 | 0.985 | 1.03 | 1.07 | 0.975 | 1.02 | 1.008 | 0.996 |
| | t/T (thickness ratio of main body and rib) | 0.35 | 0.35 | 0.35 | 0.35 | 0.25 | 0.45 | 0.28 | 0.36 |
| | n/T (thickness ratio of main body and reduced thickness) | 0.25 | 0.15 | 0.10 | 0.05 | 0.15 | 0.15 | 0.08 | 0.12 |
| | 1.3(T-n) | 1.95 | 2.21 | 2.34 | 2.47 | 2.21 | 2.21 | 2.66 | 2.86 |
| Effect | Moldability | ○ | ○ | ○ | ○ | ○ | ○ | ○ | ○ |
| | Sink mark simulated | ○ | ○ | Δ | Δ | ○ | ○ | ○ | ○ |
| | Evaluation of sink marks on actual moulded body | ○ | ○ | Δ | Δ | ○ | ○ | ○ | ○ |

TABLE 5

Examples for shape patent

| | | Comparative Example | | | |
|---|---|---|---|---|---|
| | | Comparative Example 1 | Comparative Example 2 | Comparative Example 3 | Comparative Example 4 |
| Moulded body | Resin composition | Production Example 5 | Production Example 5 | Production Example 5 | Production Example 5 |
| | Thickness of main body: T (mm) | 2 | 2 | 2 | 2 |
| Rib design | Rib thickness: t (mm) | 0.4 | 0.7 | 0.7 | 1.5 |
| | Thickness of reduced thickness part: n (mm) | 0 | 0 | 0.6 | 0.3 |
| | Rib base: R (mm) | 0 | 0 | 0.5 | 0.5 |
| | Diameter of inscribed circle: D (mm) | 2.02 | 2.06 | 1.72 | 2.28 |
| Characteristic part | Ratio D/T | 1.01 | 1.03 | 0.86 | 1.14 |
| | t/T (thickness ratio of main body and rib) | 0.20 | 0.35 | 0.35 | 0.75 |
| | n/T (thickness ratio of main body and reduced thickness) | — | — | 0.30 | 0.15 |
| | 1.3(T − n) | 2.60 | 2.60 | 1.82 | 2.21 |
| Effect | Moldability | x | ○ | ○ | ○ |
| | Sink mark simulated | ○ | x | x | x |
| | Evaluation of sink marks on actual moulded body | ○ | x | x | x |

As shown in Table 4 and Table 5, the molded products of Examples 1 to 8 in which the reduced thickness part 4 was formed, and the ratio D/T was 0.975 to 1.07 had good moldability. The evaluation of sink marks indicated that completely no sink mark was visually observed or some sink marks were visually observed only when the molded product was magnified four times. The results revealed that the structures can prevent design degradation due to sink marks. The molded products of Examples 1 to 8 were molded by using the resin composition of Production Example 5, and it is clear that the molded product having an excellent balance of the moldability, the heat resistance, and the impact resistance can be obtained. The present invention can prevent design degradation due to sink marks while setting the rib part to have a small thickness t of less than 1.3(T−n), and thus can reasonably achieve a large, lightweight moulded body with a small thickness as compared with the invention described in Patent Document 4.

REFERENCE SIGNS LIST

1 Moulded body
2 Main body
3 Rib part
3a Side face
3b Base end
4 Reduced thickness part

The invention claimed is:

1. A moulded body having a specific cross-sectional structure, the moulded body comprising a rib part standing on a back surface opposite to a design surface of a main body of the moulded body,
   a reduced thickness part being formed on the back surface of the main body at both sides or one side of the rib part,
   the ratio D/T being 0.975 to 1.07 where D is the diameter of a circle that passes through base ends of both side faces of the rib part and is in contact with the design surface of the main body positioned between the base ends, and T is the thickness of the main body at an outer side of the reduced thickness part,
   t<1.3(T−n) being satisfied where t is the thickness of the rib part, and n is the thickness of the reduced thickness part.

2. The moulded body having a specific cross-sectional structure according to claim 1, wherein the ratio t/T satisfies 0.08≤t/T≤0.47, and the ratio n/T satisfies 0.03≤n/T≤0.25 where T is the thickness of the main body, t is the thickness of the rib part, and n is the thickness of the reduced thickness part.

3. The moulded body having a specific cross-sectional structure according to claim 1, wherein the main body except the rib part has an average thickness Ta of 0.7 to 2.5 mm, the rib part has a thickness t of 0.35 to 0.75 mm, the reduced thickness part is formed within 20.0 mm from the center line of the rib part on both sides of the rib part, the reduced thickness part has a thickness gradually changing width w of 1.0 to 20.0 mm, the reduced thickness part has a maximum reduced thickness depth n of 0.1 to 0.5 mm, and the base of the rib part, continuing from the rib part to the reduced thickness part has a minimum curvature radius r of 0.1 to 1.0 mm.

4. The moulded body having a specific cross-sectional structure according to claim 1, wherein the moulded body has a projected area of more than 30,000 mm$^2$, an average thickness Ta of less than 2.5 mm, and an in-plane linear expansion coefficient determined at measurement temperatures of −30° C. and +80° C. of $4.0 \times 10^{-5}/°$ C. or less.

5. The moulded body having a specific cross-sectional structure according to claim 1, wherein the moulded body is obtained by injection molding of a resin composition containing a polycarbonate resin in an amount of 40 parts by weight or more and 90 parts by weight or less, at least one resin selected from polyester resins and polyester-polyether copolymer resins in an amount of 5 parts by weight or more and 55 parts by weight or less, and a plate-like filler having a number average major axis length of 0.1 to 40 μm in an amount of 5 parts by weight or more and 55 parts by weight or less.

6. The moulded body having a specific cross-sectional structure according to claim 5, wherein a polyester-polyether copolymer resin prepared by polymerization with a germanium compound as a catalyst, including an aromatic polyester unit and a modified polyether unit represented by General Formula 1:

General formula 1

[C.1]

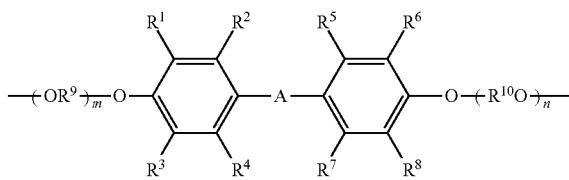

and having an IV value ranging from 0.30 to 1.00 is used.

7. The moulded body having a specific cross-sectional structure according to claim 6, wherein the aromatic polyester unit is one or more units selected from the group consisting of a polyethylene terephthalate unit, a polybutylene terephthalate unit, and a polypropylene terephthalate unit.

8. The moulded body having a specific cross-sectional structure according to claim 5, wherein the resin composition contains an impact modifier in an amount of 0.5 to 40 parts by weight.

9. The moulded body having a specific cross-sectional structure according to claim 8, wherein the impact modifier is one or more modifiers selected from the group consisting of core/shell graft polymers (1) including 10 to 90% by weight of a core that is one or more rubbery polymers selected from the group consisting of polybutadienes, butadiene-styrene copolymers, butadiene-acrylic ester copolymers, and polyorganosiloxanes and including 10 to 90% by weight of a shell composed of a polymer obtained by polymerizing one or more monomers selected from the group consisting of aromatic vinyl compounds, vinyl cyanide compounds, and (meth)acrylic ester compounds, in the presence of the core, polyolefin polymers (2), and olefin-unsaturated carboxylic ester copolymers (3).

10. The moulded body having a specific cross-sectional structure according to claim 1, wherein the moulded body is an automobile part.

11. The moulded body having a specific cross-sectional structure according to claim 10, wherein the automobile part is one or more parts selected from garnishes, pillars, and spoilers.

12. A method for producing a moulded body having a specific cross-sectional structure, the moulded body according to claim 10 being obtained by injection molding.

* * * * *